United States Patent [19]

Gerard et al.

[11] Patent Number: 4,673,065
[45] Date of Patent: Jun. 16, 1987

[54] SPRING FOR A DISC BRAKE, AND DISC BRAKE EQUIPPED WITH SUCH A SPRING

[75] Inventors: Jean-Louis Gerard, Paris; Claude Le Marchand, Domont, both of France

[73] Assignee: Bendix France, Paris, France

[21] Appl. No.: 860,947

[22] Filed: May 8, 1986

[30] Foreign Application Priority Data

May 22, 1985 [FR] France .................................. 85 07708

[51] Int. Cl.<sup>4</sup> ............................................. F16D 65/02
[52] U.S. Cl. ................................................. 188/73.38
[58] Field of Search ............... 188/73.35, 73.36, 73.37, 188/73.38

[56] References Cited

U.S. PATENT DOCUMENTS 4,181,200 1/1980 Souma .............................. 188/73.38
4,463,837 8/1984 Courbot ........................... 188/73.38

FOREIGN PATENT DOCUMENTS 0059128 9/1982 European Pat. Off. .
0106718 4/1984 European Pat. Off. .
2437528 4/1980 France .
2448071 8/1980 France .
0167538 10/1982 Japan ................................ 188/73.38

Primary Examiner—Duane A. Reger
Attorney, Agent, or Firm—Larry J. Palguta; Ken C. Decker

[57] ABSTRACT

A spring (40) comprises a folded metal leaf including a mounting portion (42) which is joined elastically by its sides, which are circumferentially spaced apart (46, 48), to two rigid actuating portions (58, 60), a first rigid portion (58) lying parallel to the axis of the disc and being capable of pushing elastically by its two free ends the support plates (26, 28) in a direction which is essentially circumferential (T), a second (60) of the rigid portions (58, 60) also lying parallel to the axis of the disc and being capable of pushing elastically, by its two free ends, the support plates (26, 28) essentially radially (R) toward the axis of the disc.

10 Claims, 7 Drawing Figures

SPRING FOR A DISC BRAKE, AND DISC BRAKE EQUIPPED WITH SUCH A SPRING

The present invention relates to a spring for a disc brake with a sliding caliper and also a disc brake equipped with such a spring.

The invention concerns more particularly a multiple-function spring which is intended to equip a disc brake whose caliper slides relative to a fixed support by means of at least two complementary axially sliding surfaces which are formed on the caliper and on the fixed support and which are held in contact by elastic means.

In the field of disc brakes of the type mentioned above, disc brakes are known whose caliper is slideably mounted relative to the fixed support by means of an axial pillar which is housed so as to slide in a corresponding bore and by means of two sliding surfaces formed so as to face one another on the caliper and on the fixed support Such a brake is described and illustrated in GB-A-No. 1,532,572. In such a brake, it is necessary to provide elastic means to hold the surfaces in contact together with noise suppression springs which are intended to push the friction components so as to bear against the opening which is provided in the fixed support to house them. The document EP-A-No. 0,030,502 proposes to use a single spring situated between the caliper and the friction components, providing the double function of maintaining the sliding surfaces in contact and of a noise suppression spring for the friction components.

Disc brakes are also known whose caliper is slideably mounted on the fixed support by means of two pairs of complementary sliding surfaces formed on the caliper and on the fixed support, respectively, the pairs of sliding surfaces being held in contact by means of two springs situated on each side of the median axial plane of the brake. Such a brake is described and illustrated in the document FR-A-No. 2,408,766. In such a brake, it is also necessary to provide noise suppression springs for the friction components in order to push the latter so as to bear against the opening in the fixed support in which they are housed.

In the brakes just described, it may be desirable to mount a particular type of friction component to which it is necessary to apply a permanent tangential force, pushing these friction components so as to bear against the opening in the fixed support in a preferential lateral position. Such a type of friction component is described and illustrated in the document EP-A-No. 0,002,399. The document states that it is necessary to provide an independent spring for each of the friction components, pushing each component into its preferential lateral position, together with the two springs for holding the caliper mentioned above.

Japanese Application for Utility Model No. 54-088,653 U filed on Jan. 21, 1981 under No. P-U-56-7130 (and corresponding to the document GB-A-No. 2,056,601) describes a spring for a disc brake which is mounted in a housing under the arch of the caliper and which co-operates with the friction components so as to push the latter radially and tangentially in order to ensure that they are held in a preferential lateral position. In this document, the spring has the general form of a very open V with end edges raised and is braced laterally against two opposite walls of the arch housing. This arrangement is thus shown to be sensitive to variations in the dimensions of the spring and of the arch housing as well as to variations in the tolerance of the respective positions of the friction components and of the caliper.

It is therefore an object of the present invention to provide the arrangement of disc brakes with a spring providing the function of a noise suppression spring and that of holding the friction components in a preferential lateral position, whose construction is simplified, which is compact and robust, whose sensitivity to the problems of tolerance is small, and which provides an improved elastic action upon the friction components, while elastically ensuring contact between two complementary axially sliding surfaces.

In addition, the invention provides a construction which enables the radial force and the tangential force to be adapted independently of one another according to the requirements for using the spring on different types of brake.

This problem is resolved according to the invention by a spring for a disc brake of the type comprising a caliper which is slideably mounted parallel to the axis of a rotating disc on a fixed support by means of at least two axially sliding surfaces which are formed on the caliper and on the fixed support and are elastically held in contact, and two friction components which are housed so as to be anchored and so as to slide axially in an opening in the fixed support in order to come into frictional engagement with the opposing surfaces of the disc, during operation of a brake actuator, the spring being mounted elastically in an opening formed in the arch of the caliper and exerting a radial force upon the support plates of the friction components, which is essentially directed along a radius of the disc, and in the direction of the axis of the latter, and a tangential force which is perpendicular to the radial force so as to push each of the friction components tangentially to the circumference of the disc to ensure that the latter are held in a preferential lateral position, characterized in that it comprises a folded metal leaf including a mounting portion which is joined elastically by its sides, which are circumferentially spaced apart, to two rigid actuating portions, a first rigid portion lying parallel to the axis of the disc and being capable of pushing elastically by its two free ends the support plates in a direction which is essentially circumferential, a second of the rigid portions also lying parallel to the axis of the disc and being capable of pushing elastically by its two free ends the support plates essentially radially towards the axis of the disc.

With such an arrangement, the spring, held by its mounting portion in the opening formed in the caliper arch, pushes the support plate by each of its rigid portions, the elastic connections between the mounting portion and each of the two rigid actuating portions may be modified at will so as to obtain the desired radial and tangential forces.

The present invention will now be described by way of example, together with its application to a disc brake, with reference to the accompanying drawings, in which.

Figure 1:
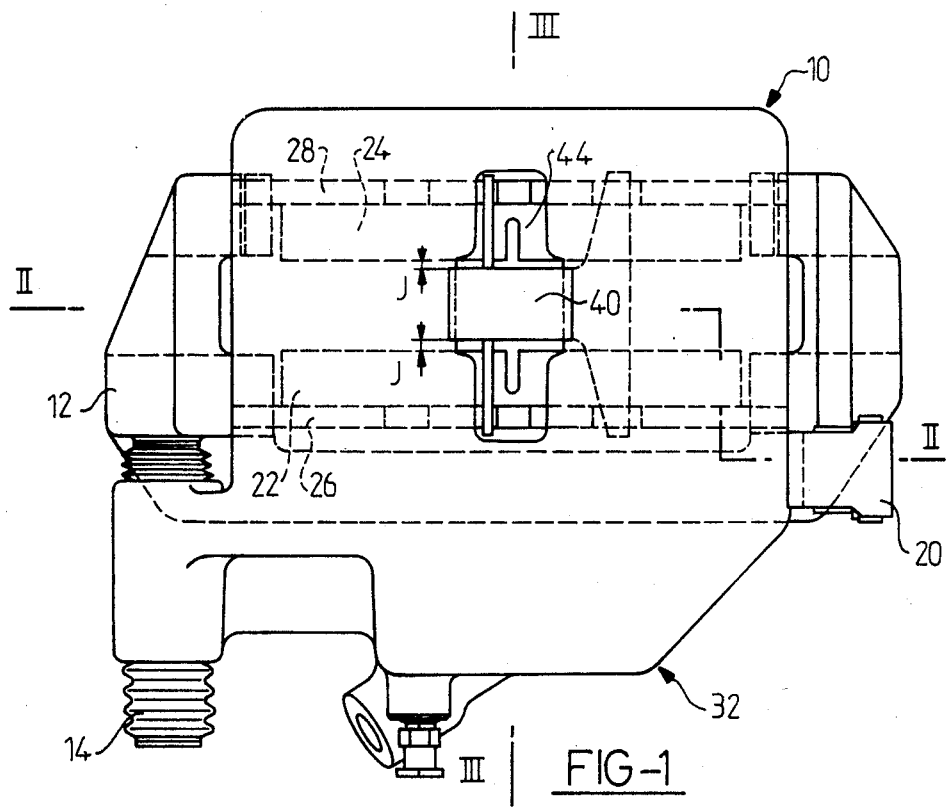
FIG. 1 shows a disc brake equipped with a spring constructed according to the present invention.
Figure 2:
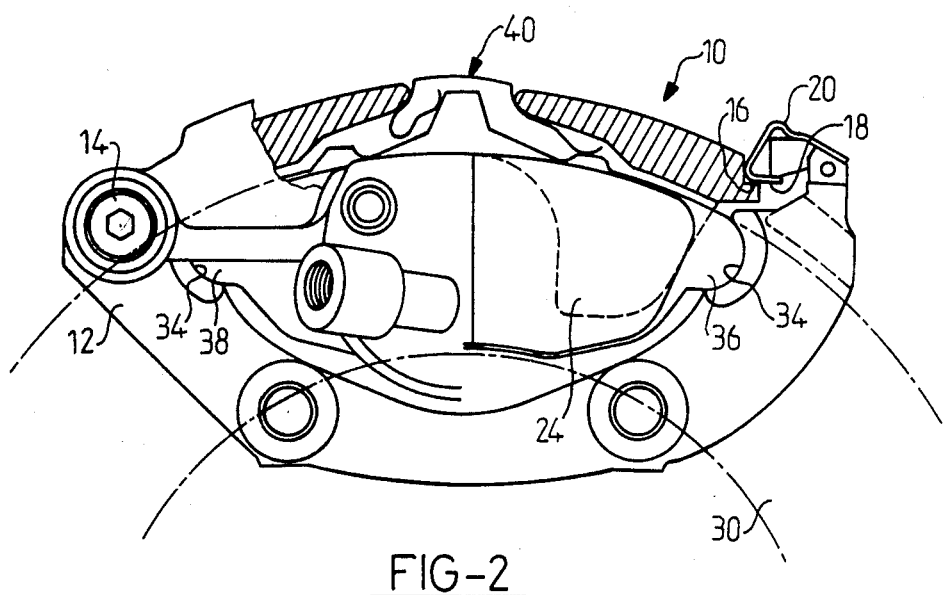
FIG. 2 is a partial section taken along the line II—II shown in FIG. 1.
Figure 3:
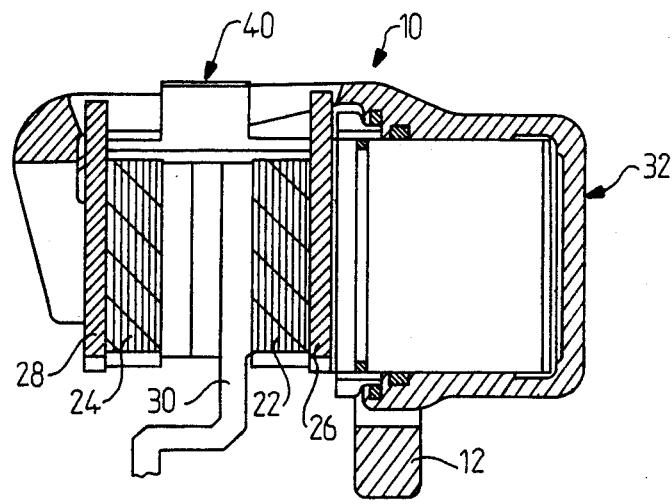
FIG. 3 is a sectional view taken along the line III—III shown in FIG. 1.

The disc brake shown in FIGS. 1 to 3 is of the type comprising a caliper 10 slideably mounted on a fixed support 12 by means of an axial pillar 14. The sliding of the caliper 10 relative to the fixed support 12 is also provided by means of axial sliding surfaces 16 and 18 which are formed, respectively, on the caliper 10 and on a spring 20 which is firmly fixed to the fixed support 12. The disc brake also comprises two friction components 22 and 24 which are equipped with support plates 26 and 28, respectively, and are capable of coming into frictional engagement with a rotating disc (30) during operation of a hydraulic brake actuator 32. The friction components 22 and 24 are housed so as to be anchored and to slide in an opening 34, which is formed in the fixed support 12. In the example illustrated, the two friction components 22 and 24 have ends 36 and 38 which have a circular profile which cooperates with complementary circular profiles of the opening 34. Such a type of friction component is described and illustrated in greater detail in EP-A-No. 0,002,399. For this type of friction component, it is desirable to exert a tangential force upon the support plate which holds the latter in a preferential lateral position bearing against the opening arranged in the fixed support 12.

Figure 4:
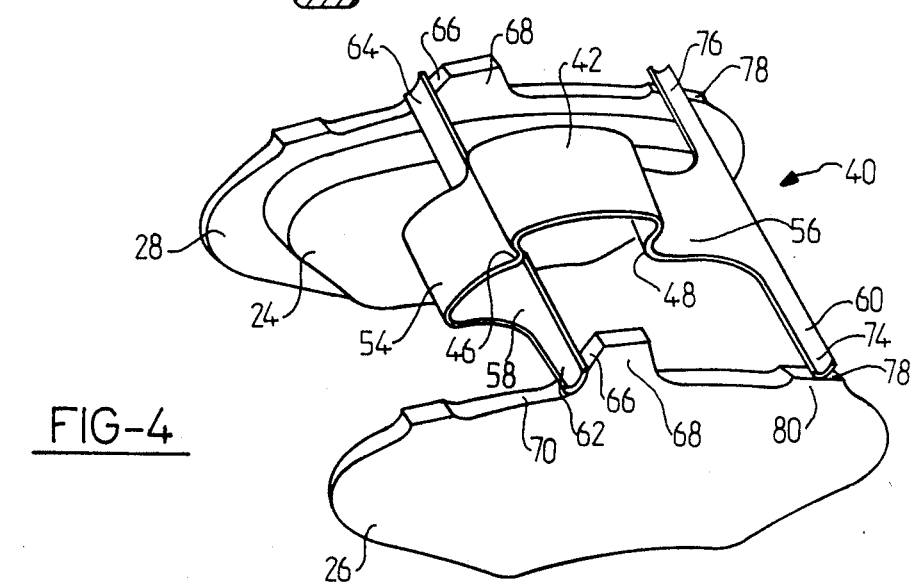
FIG. 4 is an enlarged perspective view, showing the co-operation of the spring with the friction components.
Figure 5:
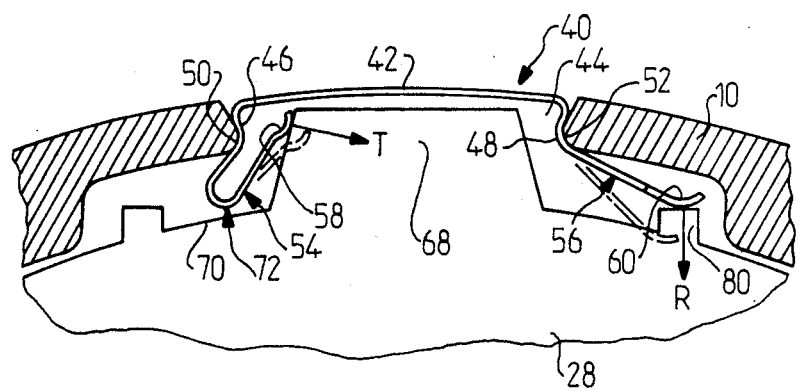
FIG. 5 is an enlarged view of a detail of FIG. 2 showing the installation of the spring in the arch of the caliper of the disc brake shown in FIG. 1.

The disc brake illustrated in FIGS. 1 to 3 is equipped with a spring 40 constructed in accordance with the present invention. For the description of the spring 40, reference should be made particularly to FIGS. 4 and 5. The spring 40 consists of a folded metal leaf which comprises a mounting portion 42 which has the general shape of the Greek letter $\Omega$ and which is mounted elastically in an opening 44 formed in the arch of the caliper 10. The sides which are circumferentially spaced apart 46 and 48 which form the portions of the letter $\Omega$ which are drawn together cooperate with edges which are circumferentially spaced apart 50 and 52 of the opening 44. The sides which are circumferentially spaced apart 46 and 48 are extended by elastic portions 54 and 56, respectively. These elastic portions 54 and 56 terminate in two rigid portions 58 and 60 which extend axially on each side of the corresponding elastic portion 54 or 56. A first rigid portion 58 which is associated with the elastic portion 54 has two free ends 62 and 64 which each push, essentially circumferentially, support plates 26, 28 through co-operation with bearing surfaces 66 which are formed on the side of a projection 68 which is formed on the peripheral side 70 of each of the support plates 26 and 28. As shown in FIGS. 4 and 5, the rigid portion 58 is channel-shaped, the corresponding elastic portion 54 forming a pronounced fold 72 so as to allow the rigid portion 58 to push the projection 68 outside the zone occupied by the friction components and by the disc. In a similar way, the rigid portion 60 is channel-shaped and incorporates two free ends 74 and 76 which co-operate with bearing surfaces 78 which lie essentially circumferentially on projections 80 which are formed on the peripheral side 70 of the support plates 26 and 28. Referring to FIG. 5, it is seen that the first rigid portion 58, owing to the fold 72, exerts an essentially tangential force T upon the projection 68, and in a similar way, the second rigid portion 60 exerts an essentially radial force R upon the projection 80. The position of the rigid portions 58 and 60 when the spring 40, mounted in the opening 44, is not pushing the friction components 22 and 24 is shown as a broken line in FIG. 5. Concerning in particular the elastic portion 56, it is seen that the latter follows the shape of the edge 52 of the opening 44 and this all the more so because the rigid portion 60 is pushed upwards in FIG. 5 by the projection 80. A variable stiffness of the elastic portion 56 is thus obtained according to a law which depends on the rigidity of the elastic portion 56 and on the progressive contact of this portion with the edge 52 of the caliper 10.

By reaction to the force R applied to the projection 80, the fold 48 of the spring 40 exerts an upward force upon the edge 52 of the caliper 10, referring to FIG. 5, and this reaction force holds the sliding surfaces 16 and 18 in contact such as are shown in FIG. 2.

It will be understood that owing to the invention, the spring 40 is held in the opening 44 of the arch of the caliper 10 by its $\Omega$-shaped portion and does not risk being damaged during dismantling and remounting of the friction components, for example; in addition, the construction of the spring, which is the subject of the invention, easily allows by a change of shape of the elastic portions 54 and 56 the values of the tangential force T and the radial force R to be modified according to requirements independently of one another. Referring to FIG. 1, it is seen that on each side of the spring 40, the arch opening 44 has reduced portions so as to immobilize the spring 40 axially relative to the caliper 10, by arranging a clearance J between the edges which are axially spaced apart of the mounting portion 42 and the edges of the enlarged portion of the opening 44. The value of the clearance J shown in FIG. 1 has been considerably increased to make it visible.

Figure 6:
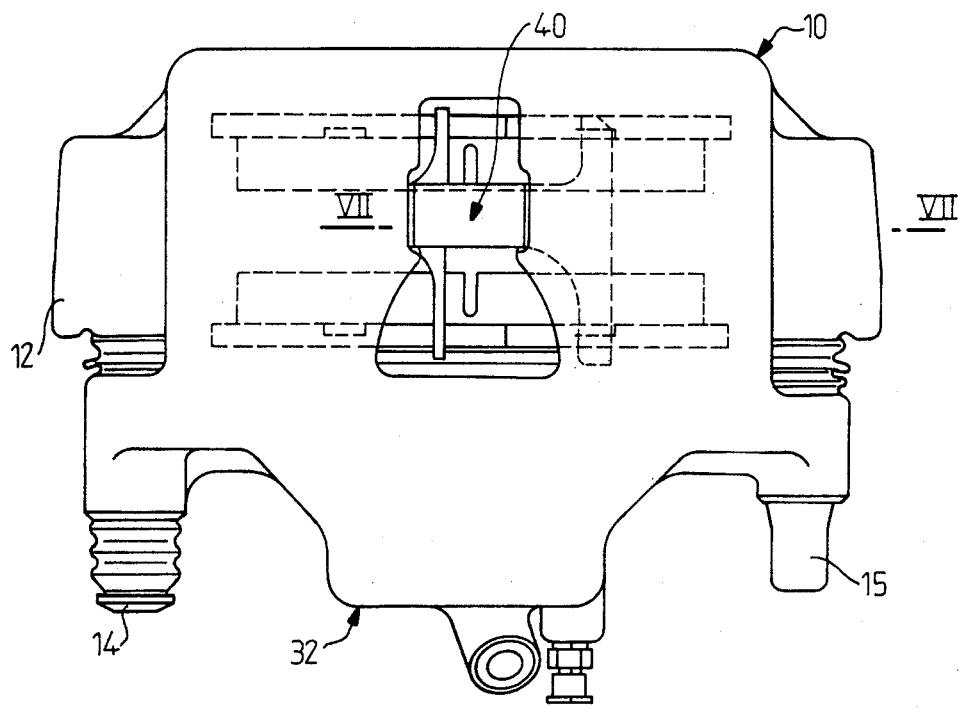
FIG. 6 is a view similar to that shown in FIG. 1 for another type of brake.
Figure 7:
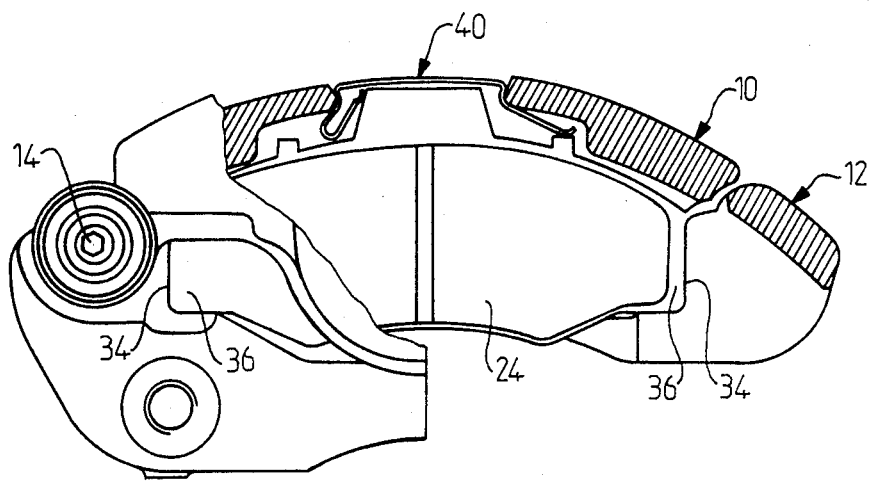
FIG. 7 is a partial section taken along the line VII—VII shown in FIG. 6.

FIGS. 6 and 7 show another type of brake equipped with the spring which is the subject of the invention. It should be noted that the same components carry the same references when they fulfil the same functions as those of the first type of brake. The description is the same as for the first type of brake, and reference should advantageously be made to that description, and mention will only be made with regard to FIGS. 6 and 7 of the differences relative to the first type of brake. The brake shown in FIGS. 6 and 7 comprises a second pillar 15 for axial sliding of the caliper 10 upon the fixed support 12, the internal diameter of the bore which is formed in the caliper 10 and which houses the external surface of the pillar form the two axial sliding surfaces formed on the caliper and the fixed support, respectively, these are thus the two surfaces which are held in contact by the reaction of the spring 40 upon the caliper. It will also be noticed in FIG. 7 that the friction components and the fixed support co-operate by means of surfaces which are flat and are no longer rounded, nevertheless these flat surfaces, which may be seen in the right hand portion of FIG. 7, are held in contact by the spring 40 in a preferential position so as to prevent noise during braking applications. As will be seen, the invention is not limited by the shape of the zones for anchoring and for sliding of the friction components, nor by the shape of the sliding surfaces between the fixed support and the caliper.

In the two embodiments illustrated, the mounting portion 42 of the spring 40, owing to its shape being that of the letter $\Omega$, may be ratcheted into the opening 44 in the arch of the caliper 10. This arrangement gives additional security to the correct operation of the spring, which is the subject of the invention.

It is clear that the invention is not limited to the embodiments described, in particular the elastic portions 54 and 56 may be folded in a different manner as a function of the shape of the projections with which the rigid portions must co-operate, for example the projection 80 may be omitted and the force of the second rigid portion may be applied directly to the surface 70 of the peripheral side of the support plates.

We claim:

1. Spring (40) for a disc brake of the type comprising a caliper (10) which is slideably mounted parallel to an axis of a rotating disc (30) on a fixed support (12) by means of at least two axially sliding surfaces (16, 18) which are formed on the caliper (10) and on the fixed support (12) and are elastically held in contact, and two friction components (22, 24) which are housed so as to be anchored and to slide axially in an opening (34) in the fixed support, in order to come into frictional engagement with opposing surfaces of the disc during operation of a brake actuator (32), the spring being mounted elastically in an opening (44) formed in the arch of the caliper and exerting a radial force (R) upon the the support plates (26, 28) of the friction components (22, 24), which is essentially directed along a radius of the disc (30) in a direction of an axis of the latter and a tangential force (T) which is perpendicular to the radial force (R) so as to push each of the friction components (22, 24) tangentially to the circumference of the disc to ensure that the latter are held in a preferential lateral position, characterized in that the spring comprises a folded metal leaf including a mounting portion (42) which is joined elastically by its sides which are circumferentially spaced apart (46, 48) to two rigid actuating portions (58, 60), a first rigid portion (58) lying parallel to the axis of the disc (30) and being capable of pushing elastically by two free ends (62, 64) the support plates (26, 28) in a direction which is essentially circumferential (T), a second (60) of the rigid portions (58, 60) also lying parallel to the axis of the disc (30) and being capable of pushing elastically by its two free ends (74, 76) the support plates (26, 28) essentially radially (R) towards the axis of the disc.

2. Spring for a disc brake according to claim 1, characterized in that each of the rigid portions (58, 60) is joined elastically to the said mounting portion (42) through an elastic portion (54, 56) which is peculiar to the rigid portion.

3. Spring for a disc brake according claim 2, characterized in that each of the rigid portions (58, 60) is capable of co-operating with each of the support plates (26, 28) through bearing surfaces (66, 78) on a peripheral side (70) of each of the support plates (26, 28).

4. Spring according to claim 3, characterized in that the first rigid portion (58) is capable of co-operating with a bearing surface (66) which extends essentially radially from the peripheral side (70) and is formed on a side (66) of a projection (68) which is formed on the peripheral side.

5. Spring according to claim 4, characterized in that the second rigid portion (60) is capable of co-operating with a bearing surface (78) which extends essentially circumferentially from the peripheral side (70).

6. Spring according to claim 5, characterized in that each of the elastic portions (54, 56) is capable of partially coming to bear against a corresponding surface (50, 52) of the caliper (10) so as to increase the stiffness of the elastic portion (54, 56).

7. Spring according to claim 6, characterized in that the mounting portion has the general shape of the letter $\Omega$ and may be ratcheted into the opening (44) formed in the arch of the caliper.

8. Spring according to claim 7, characterized in that the mounting portion (42) is mounted with a small axial clearance (J) in a portion of the opening (44) which is enlarged circumferentially, thus immobilizing axially the said spring (40) relative to the caliper (10).

9. Spring according to claim 8, characterized in that each of the rigid portions (58, 60) is channel-shaped, an external surface of the latter (58, 60) being capable of bearing against the bearing surfaces (66, 78).

10. Disc brake of the type comprising a caliper (10) which is slideably mounted on a fixed support (12) by means of an axial pillar (14) and of two axially sliding surfaces (16, 18–15) which are formed on the caliper and the fixed support, respectively, characterized in that the brake is equipped with a spring (40) according to claim 9, the spring (40) elastically pushing the caliper (10) radially outwards so as to ensure that the axially sliding surfaces (16, 18–15) are held in contact.

* * * * *